US009723112B1

(12) United States Patent
Kozlovsky et al.

(10) Patent No.: US 9,723,112 B1
(45) Date of Patent: Aug. 1, 2017

(54) BIG DATA TRANSFER OPTIMIZATION

(71) Applicant: EMC IP Holding Company LLC, Hopkinton, CA (US)

(72) Inventors: Vitaly Kozlovsky, St. Petersburg (RU); Andrey Pakhomov, St. Petersburg (RU); Ivan Andreyev, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 104 days.

(21) Appl. No.: 14/674,078

(22) Filed: Mar. 31, 2015

(51) Int. Cl.
| | |
|---|---|
| *G06F 13/00* | (2006.01) |
| *H04L 29/06* | (2006.01) |
| *H04L 29/08* | (2006.01) |
| *H04L 5/14* | (2006.01) |
| *H04W 84/12* | (2009.01) |

(52) U.S. Cl.
CPC .......... *H04L 69/02* (2013.01); *H04L 5/14* (2013.01); *H04L 69/03* (2013.01); *H04L 69/161* (2013.01); *H04L 69/326* (2013.01); *H04W 84/12* (2013.01)

(58) Field of Classification Search
CPC ......... H04L 29/06102; H04L 29/06149; H04L 47/196; H04L 69/02; H04L 69/161; H04L 69/326; H04L 69/03; H04L 5/14; H04W 84/12

USPC ................................. 709/230, 231–234, 236
See application file for complete search history.

(56) References Cited

U.S. PATENT DOCUMENTS

2016/0269927 A1* 9/2016 Kim .................. H04W 28/0263

OTHER PUBLICATIONS

Vinay Jonnakuti et al.; WAN Optimization Controller Technologies; EMC Techbooks; Version 3.0; 2013.*

* cited by examiner

*Primary Examiner* — Kenneth R Coulter
(74) *Attorney, Agent, or Firm* — Staniford Tomita LLP

(57) ABSTRACT

Embodiments are described for systems and methods that optimize large-scale data transfers over a wide area network by providing a data transmission protocol stack comprising a TCP layer that exchanges data processed by a host, and an IP layer that transports datagrams encapsulating the data to routers in the WAN, and a UDP-based transmission layer within the data transmission protocol stack that interfaces with the TCP layer and transmits data and control packets between the host and receivers of the WAN using a unicast duplex protocol. The stack has a WAN optimization components layer that interacts with the UDP-based transmission layer and provides transport protocol optimization through the UDP-based transmission layer and certain data de-duplication, compression, link aggregation, and application awareness functions.

20 Claims, 8 Drawing Sheets

400

| TYPE VALUE | PACKET TYPE |
|---|---|
| 0x0 | Data packet (DATA) |
| 0x1 | Probing packet, forward direction (RTT) |
| 0x2 | Probing packet, backward direction (BACKRTT) |
| 0x3 | Bitmap packet (BITMAP) |
| 0x4 | Connection request (CONN_REQ) |
| 0x5 | Connection response (CONN_RSP) |
| 0x6 | Connection acknowledgement (CONN_ACK) |
| 0x7 | Reserved (MTU probing) (MTU) |
| 0x8 | Reserved (MTU probing) (MTU_ACK) |
| 0x9 | Disconnection request (DISCO_REQ) |
| 0xa | Disconnection response (DISCO_RSP) |
| 0xb | Disconnection acknowledgement (DISCO_ACK) |
| 0xc | Connection verification request (VERIFY_REQ) |
| 0xd | Reserved |
| 0xe | Reserved |
| 0xf | Reserved |

FIG. 4

BIG DATA TRANSFER OPTIMIZATION

TECHNICAL FIELD

Embodiments are generally directed to data storage systems, and more specifically to optimizing data transfers among distributed data centers.

BACKGROUND

Data migration between geographically distributed data centers is a critical task in modern large-scale computer networks. Due to growing amounts of transmitted data and limited throughput of channels traditional protocols like TCP (Transmission Control Protocol) are becoming outdated. TCP has proven to be very successful and greatly contributes to the popularity of today's Internet and still contributes the majority of the traffic on the Internet. However, TCP is not perfect and it is not designed for every specific application. In the last several years, with the rapid advance of optical networks and rich Internet applications, TCP has been found inefficient as the network bandwidth-delay product (BDP) increases. Though its AIMD (additive increase multiplicative decrease) algorithm reduces the TCP congestion window drastically, it fails to recover it to the available bandwidth quickly, and theoretical flow level analysis has actually shown that TCP becomes more vulnerable to packet loss as the BDP increases. Thus, the Internet transmission protocols must be optimized to maintain viability in heavy data traffic environments. Current methods of optimization however, often involve changing applications to accommodate different transmission protocols. This limits data mobility and imposes great cost overheads for system administrators.

FIG. 1 illustrates present methods of transmitting data in large network systems using certain known transmission protocols. In system 100 of FIG. 1, different networks 102-106 communicate to each other over a wide area network (WAN) 110. Each individual network 102-106 may be a local area network (LAN) or other similar type of network comprising any number of server and/or client computers that are coupled together and then coupled to the WAN 110 through a gateway or network interface device. The networks 102-106 may represent data centers that include large-scale storage devices or storage networks and one or more servers to process the data to be stored and retrieved. In present systems, the standard communication of applications and data transfer among networks, such as 102 to 106 is performed with the TCP/IP protocol 112. The TCP protocol generally does not run well on WANs when either latencies or packet drop rates are high, such as due to distance, bad network connections, congestion, and other similar factors.

Other protocols have been developed to overcome the deficiencies of standard TCP/IP, such as the BURST protocol from EMC Corporation. BURST is a replacement protocol for TCP that has proven to be reliable. It is built on top of the User Datagram Protocol (UDP) and is biased towards Big Data transfers, and was developed to overcome TCP's inefficiency in high bandwidth-delay product (BDP) networks with random losses. As shown in FIG. 1, this known alternative protocol 114 to TCP/IP 112 comprises the BURST layer on top of the UDP layer over the IP layer. The UDP layer is a connectionless protocol that emphasizes low-overhead operation and reduced latency in favor of error checking and delivery validation. Traditional approaches 112 that use TCP are generally not efficient enough to transmit big data volumes between datacenters, e.g., 102 to 106. The use of an alternative, more efficient protocol 114, such as BURST often requires application changes, additional work and, in many cases may be infeasible to implement, such as if an application cannot be changed.

What is needed therefore, is a way to provide a transmission protocol without requiring changes in the applications so as to significantly improve data mobility, which is extremely important for big data stores synchronization and backup. Such a solution may be provided through the usage of standalone software module based on EWOC and implementing base TCP APIs (application programming interfaces) for invasive substitution of a standard operating system network modules.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, BURST, and EWOC are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 is a table listing example packets used in the BURST protocol, under an embodiment.

DETAILED DESCRIPTION

Figure 1:
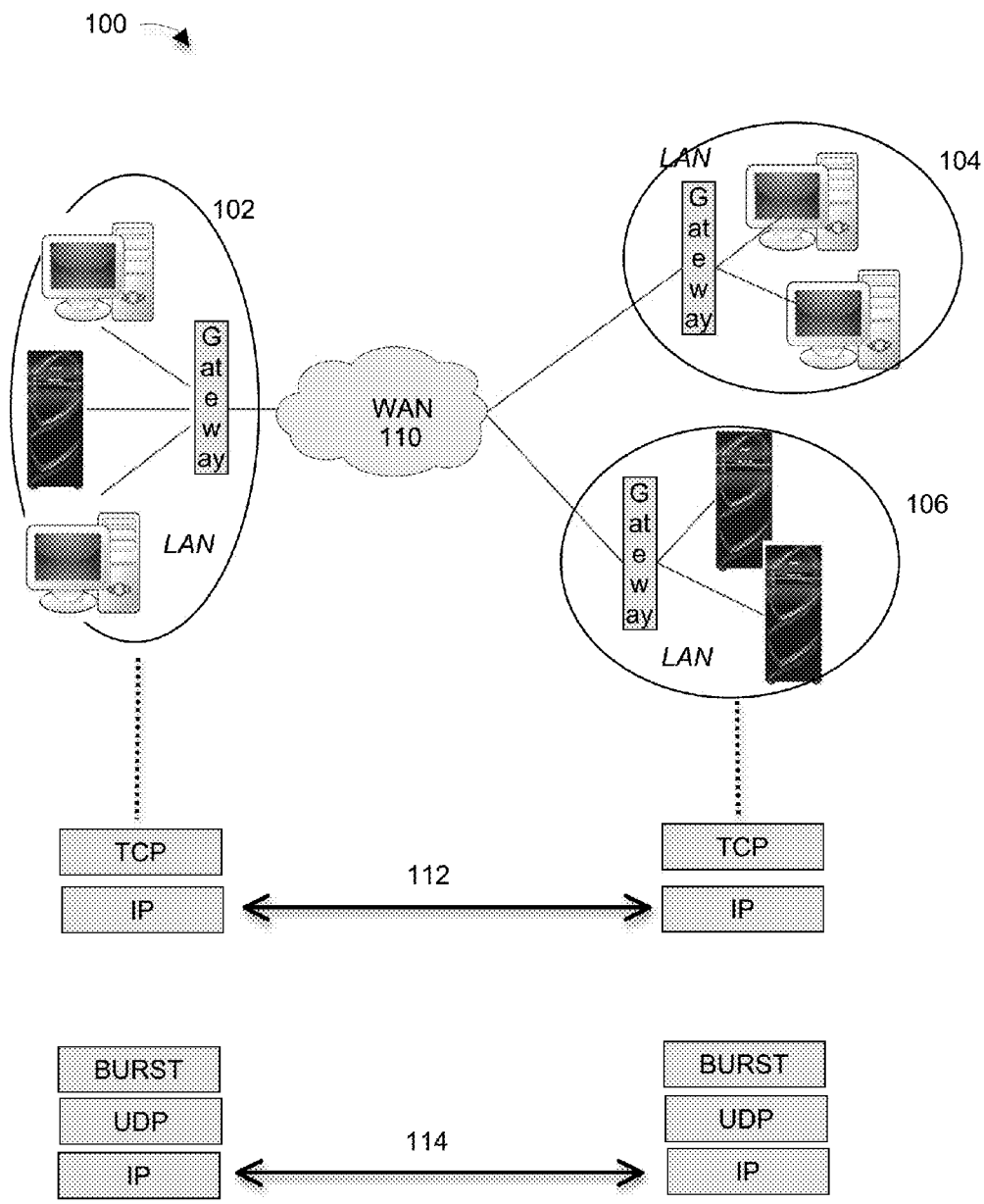
FIG. 1 illustrates present methods of transmitting data in large network systems using certain known transmission protocols.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Figure 2:
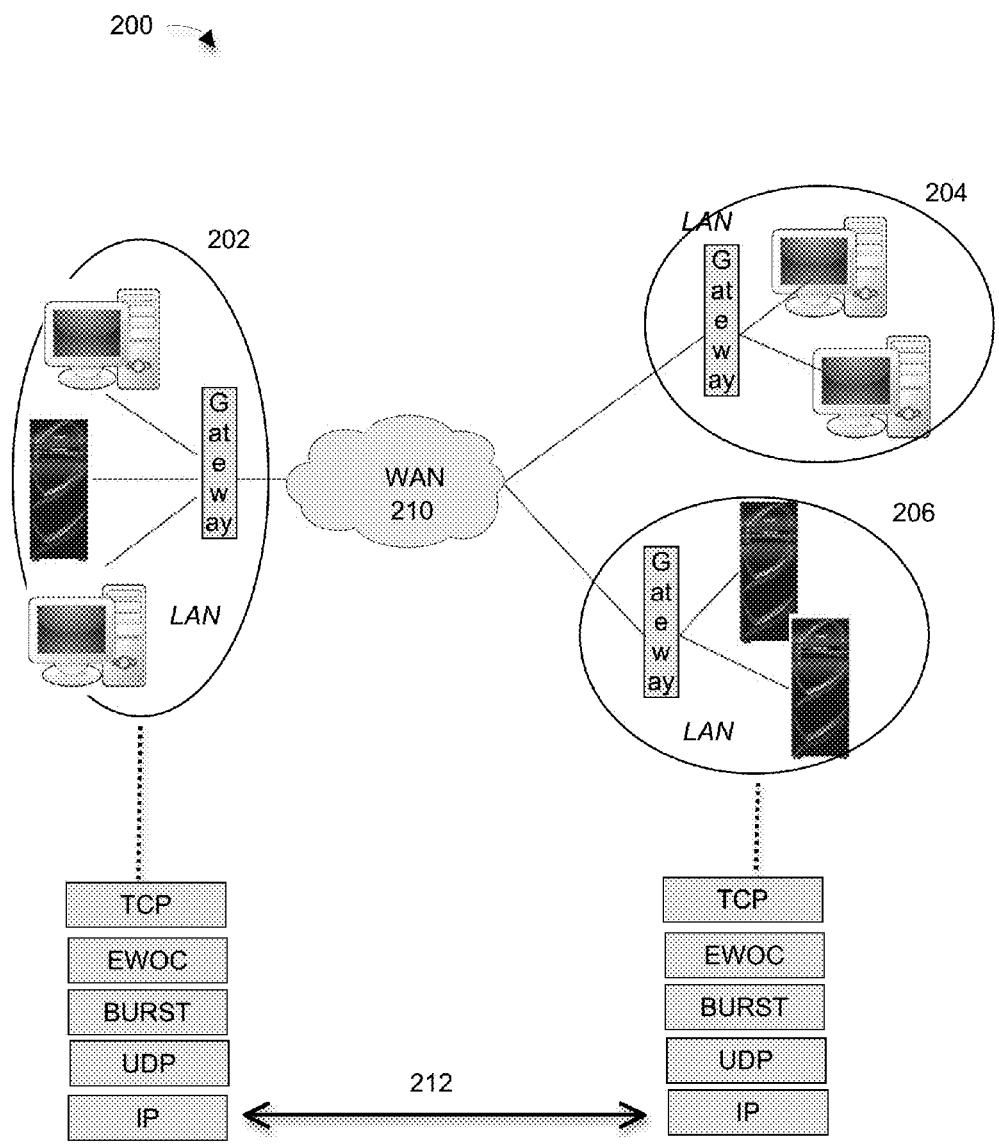
FIG. 2 illustrates present methods of transmitting data in large network systems using WAN optimized transmission protocols, under some embodiments.

Disclosed herein are methods and systems of optimizing big data transfers over large-scale networks without requiring changes to applications or undue system administration overhead. Embodiments extend existing known data transfer protocols by adding a wide-area network optimization layer to BURST and UDP layers. FIG. 2 illustrates present methods of transmitting data in large network systems using WAN optimized transmission protocols, under some embodiments. In system 200 of FIG. 2, different networks or data centers 202-206 communicate to each other over a wide area network (WAN) 210. Each individual network 202-206 may be a local area network (LAN) or data center or other similar type of network comprising any number of server and/or client computers that are coupled together and then coupled to the WAN 212 through a gateway or network interface device. As in FIG. 1, the networks 202-206 may represent data centers that include large-scale storage devices or storage networks and one or more servers to process the data to be stored and retrieved.

Under some embodiments, the networks of FIG. 2, e.g., 202 and 206 communicate through an advanced TCP/IP protocol 212 that includes a BURST layer provided by EMC Corporation, which is an effective data transmission protocol over UDP, and standard TCP and IP layers. In accordance with the Open Systems Interconnection (OSI) standard, the TCP protocol is within the Transport Layer that performs host-to-host communications on either the same or different hosts and on either the local network or remote networks separated by routers. It provides a channel for the communication needs of applications. TCP provides flow-control, connection establishment, and reliable transmission of data. The IP protocol is within the Internet layer and has the task of exchanging datagrams across network boundaries. It provides a uniform networking interface that defines the addressing and routing structures used for the TCP/IP protocol suite, and its function in routing is to transport datagrams to the next IP router that has the connectivity to a network closer to the final data destination.

Figure 3:
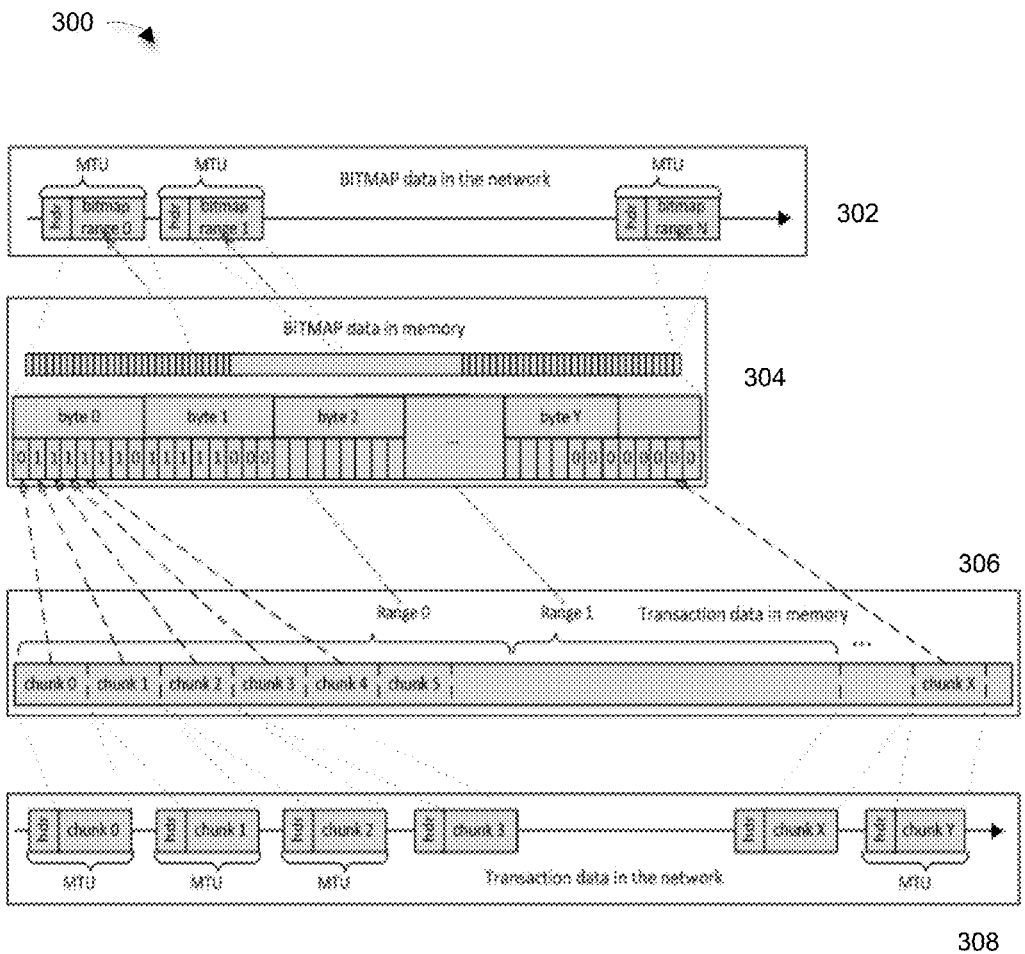
FIG. 3 illustrates the organization of BURST data for use in a WAN optimization system, under some embodiments.

For the embodiment of FIG. 2, the BURST layer is completely built on top of UDP as both data and control packets are transferred using UDP. It is a connection-oriented, message-oriented, unicast, and duplex protocol that optimizes bulk data transfers, such as replication. BURST preserves user message boundaries during network transfers. A user message is called the transaction in BURST, and BURST breaks the transaction down to data chunks. The size of the data chunks is fixed for any given transaction and does not exceed underlying transport MTU (UDP) including overhead. The last data chunk in transaction can be less than other chunks and is called the partial data chunk. Any given data chunk present on the receiver side is tracked in the bitmap. Each data chunk is associated with one bit in the bitmap and the bitmap holds all the bits for the transaction. The bitmap is divided into the ranges and the length of the range is based on number of bits that can fit into underlying transport MTU (maximum transmission unit), e.g., UDP, including overhead. FIG. 3 illustrates the organization of BURST data for use in a WAN optimization system, under some embodiments. As shown in diagram 300, the bitmap for BURST data in the network 302 comprises individual bitmaps with associated headers. These are then concatenated together to form the bitmaps in memory 304, as shown. Individual data chunks are then organized into ranges to form the transaction data in memory 306. The data chunks are then separated into individual units with associated headers to form the transaction data in the network 308.

The BURST protocol comprises certain defined protocol data units (PDUs) that fit into the underlying transport layer MTU (UDP). FIG. 4 is a table listing example packets used in the BURST protocol, under an embodiment. As shown in Table 400, the Packet Type is a 4-bit field (bits 0-3) that is presents in all BURST PDUs' headers and uniquely identifies its meaning, as shown in the Packet Type column of the table. It should be noted that the packet types and type values in FIG. 4 are examples of certain packet type definitions, and other packet types are also possible. Certain PDUs are used to establish a connection, while others (e.g., DATA, RTT, BACKRTT and BITMAP) are used during the connected state, and still others are used during the disconnection procedure. Specific bit assignments, configurations, and definitions (e.g., flags, reserved bits, etc.) may be provided for each of the PDUs in accordance with the BURST protocol defined by EMC Corporation, or any other definition appropriate for specific implementations and network environments.

Figure 5:
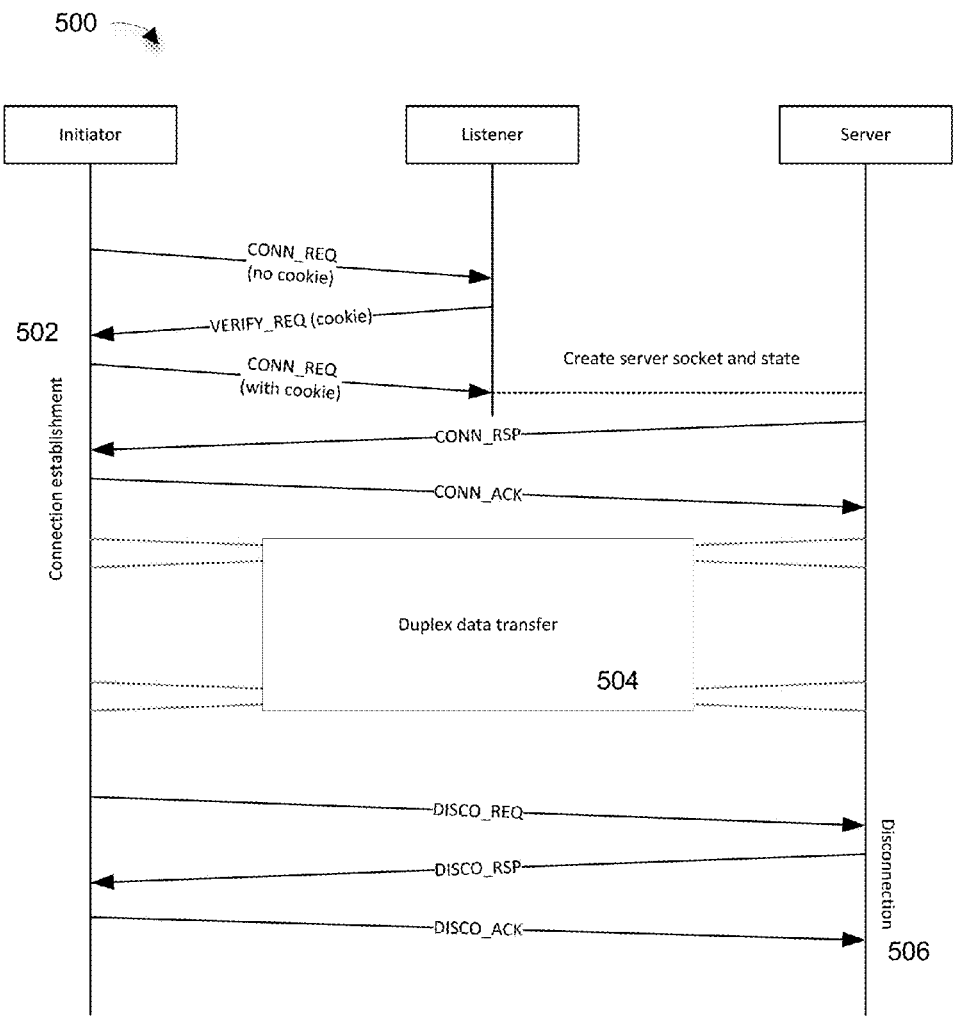
FIG. 5 illustrates the transmission of PDUs during the establishment, connected, and disconnection states of a BURST session, under an embodiment.

The appropriate PDUs are exchanged during relevant stages of the transmission process. FIG. 5 illustrates the transmission of PDUs during the establishment, connected, and disconnection states of a BURST session, under an embodiment. Diagram 500 illustrates the message flows of PDUs among an initiator, listener and server for the main stages of connection establishment 502, data connection (duplex data transfer) 504 and disconnection 506 for an example BURST session.

The BURST protocol defined herein is a UDP-based transport protocol that uses API semantics compatible with Berkeley sockets. It survives high latency and packet drops, and is optimized for best possible performance on links with high losses and delays while keeping memory consumption within given constraints. It employs smart flow control mechanisms optimized for best possible performance on large, medium, and small transfer sizes while keeping a low memory footprint. It is designed to be fair to other concurrent transfers. It employs smart available-link bandwidth probing mechanisms that allow the highest transfer speeds while releasing a fair share of bandwidth to other concurrent transfers in the network. It is designed and optimized primarily for big data transfers.

As shown in FIG. 2, the protocol stack for transfer 212 includes an EWOC layer over the BURST layer. In an embodiment, the EWOC layer comprises a WAN Optimization Components layer, which is a software package that uses optimized data de-duplication and compression algorithms along with BURST. The EWOC is configured to be used in two ways: (1) as a library that can be integrated into application, and (2) as an operating system-level feature when EWOC provides a network tunnel transparent for the application, though other implementations and configurations are also possible, and embodiments are not so limited. For this new software stack, the TCP functionality is provided on top of EWOC and BURST so that existing applications need not be changed to use more effective transport for the data exchange.

The software module and protocol stacks for the WAN optimized transmission 212 might be used in variety of ways to speed up the data exchange and augment volumes of transmitted data within the same physical channel. Embodiments may be applied in a number of different network environments. For example, a software defined data center, such as an elastic cloud storage (ECS) appliance solutions might benefit of the new transport protocol since it adds new quality of service without existing software changes. Another example is the iRODS (integrated Rule-Oriented Data System), which is an open-source, distributed data management software in use at research organizations and government agencies worldwide for creating data grids, digital libraries, persistent archives, etc. One example application is its use at genome research organizations, and other similar organizations. For this example use-case, replication and backup of genomic data is rather slow for traditional environment. Although iRODS is open source software and can be modified without approval of its owners the modification is generally not practical as modified software does not always have community support and can be difficult to implement and propagate. A solution not requiring application modification is thus much more preferable from maintenance point of view.

Figure 6:
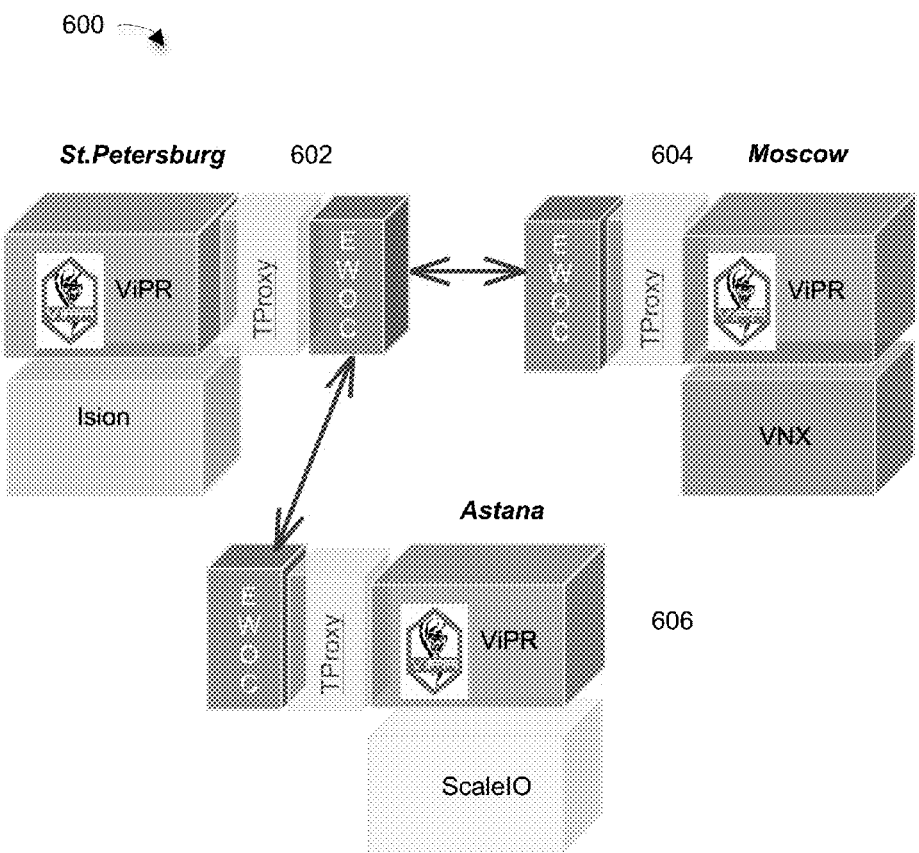
FIG. 6 illustrates the use of the EWOC layer to transfer data among large, distant data centers, under some embodiments.

FIG. 6 illustrates the use of the EWOC layer to transfer data among large, distant data centers, under some embodiments. As shown in system 600, data centers 602-606 located in three major cities include a ViPR platform from EMC Corporation (or similar platform) along with data transmission interfaces including a respective EWOC interface. The ViPR platform represents storage automation software that provides a single automated way to abstract, pool and provision storage resources to deliver storage-as-a-service. Thus, the data centers 602-606 represent software-defined storage networks utilizing ViPR to manage and automate all storage resources for traditional and cloud storage platforms. Each data center includes at least one ViPR controller that comprises storage automation software that centralizes and transforms storage into a simple, extensible, and open platform. It abstracts and pools resources to deliver automated, policy-driven storage services on demand through a self-service catalog. Although embodiments are described with respect to a ViPR implementation, it should be noted that use of the EWOC interface is not so limited, and other implementations of data storage within data centers such as 602-606 may also be possible. System 600 illustrates an example in which large amounts of data may be transmitted among geographically distributed data centers. The data sets may be so large and/or complex as to constitute "Big Data" applications that cannot practically be processed using traditional data processing applications, such as relational database management systems (RDMS or DBMS).

Figure 7:
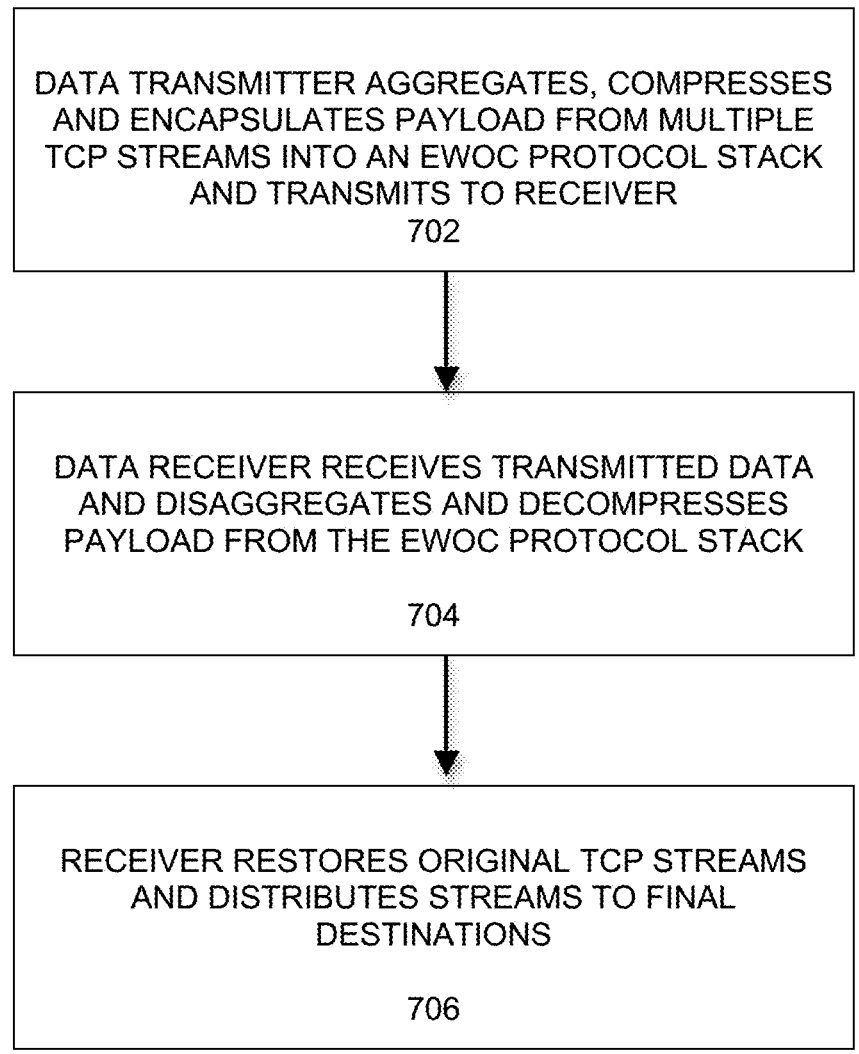
FIG. 7 is a flowchart that illustrates a method of transferring data across a wide area network using an WAN optimization components layer, under some embodiments.

System 600 shows a system built on a standard Linux kernel functionality, i.e., IP tables set up for transparent proxying (TProxy) and policy routing, used in conjunction with the EWOC-based process that transparently intercepts TCP transfers from different applications. In an embodiment, an EWOC-based application is called an EWOC Daemon (EWOCD) and, for instance, can be run on a physical or virtual Linux host in the same LAN segment. For a transmitting data center (e.g., 602) The payload from multiple TCP streams are aggregated, compressed and encapsulated into an EWOC protocol stack. The remote EWOCD (e.g., 606) does the reverse transformations, restores original TCP streams and distributes them to their final destinations. No modifications to existing applications are needed. The only changes are to the routing rules so that application traffic can be directed to the appropriate EWOCD home nodes. The optimization can be easily disabled to fall back to original implementations. FIG. 7 is a flowchart that illustrates the above process steps (702 to 706) just described above. Thus, as shown in FIG. 7, the data transmitter aggregates, compresses and encapsulates the payload from multiple TCP streams into an EWOC protocol stack, block 702. The receiver receives the transmitted data and disaggregates and decompresses the payload from the EWOC protocol stack, block 704, and then restores the original TCP streams and distributes them to their final destinations, block 706.

In an embodiment, the EWOC layer is a set of modular software components developed to provide building blocks for WAN transfer optimization tasks and provides the following functionalities: transport protocol optimization (e.g., BURST protocol as a TCP replacement); data de-duplication over the wire (e.g., ViPR W-EDRS); compression (e.g., ViPR C-EDRS); link aggregation; and application awareness. The EWOC Daemon application-aware service built on top of the EWOC stack and can run on any physical or virtual POSIX system and on multiple clients. It is used to deliver WAN optimization to systems where a built-in solution requires a lot of integration efforts and/or where optimization for multiple clients is required. The EWOC layer is built-on BURST, which is a highly optimized UDP-based transport protocol. The BURST protocol may be embedded in the EWOC layer, but it can also be delivered as a standalone product (e.g., software development kit).

Figure 8:
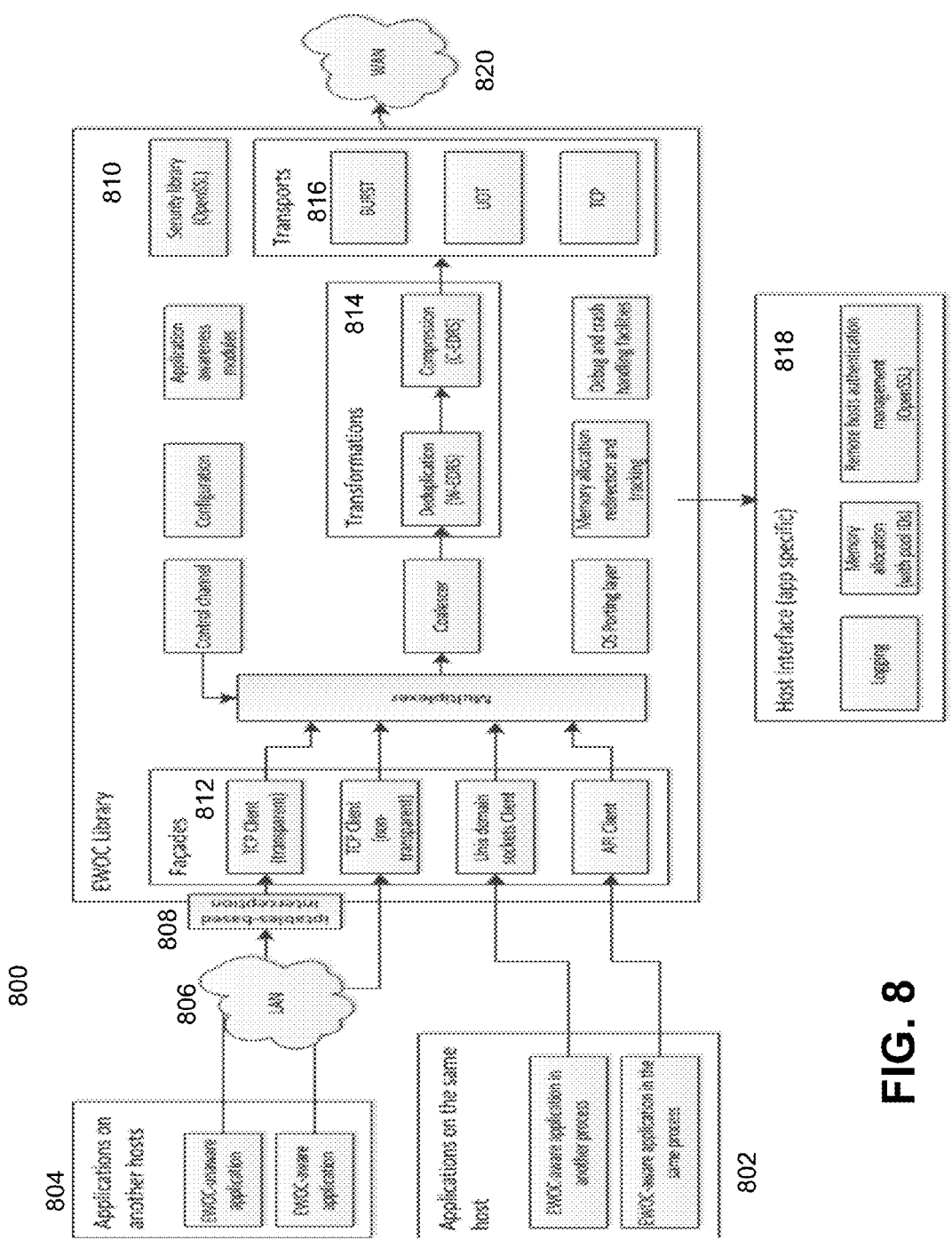
FIG. 8 is a block diagram that illustrates components of an EWOC library for use in a WAN optimized system, under some embodiments.

FIG. 8 is a block diagram that illustrates components of an EWOC library for use in a WAN optimized system, under some embodiments. A number of different data processing applications for transmitting, receiving, and/or processing transmitted or received data are organized into applications that are run on the same host 802 and applications that are run on other hosts 804. The applications may be EWOC-aware or EWOC-unaware, as shown. Within the OSI model, the applications 802 and 804 operate within the application layer, in which the applications create user data and communicate this data to other applications on another or the same host. The applications make use of the services provided by the underlying, lower layers, especially the Transport Layer which provides pipes to other processes that are addressed via ports, which essentially represent services.

The applications 802 run on the same host as the EWOC library 810 are input directly to a facades interface 802; while applications run on other hosts are input to the facades interface through a network connection (e.g., LAN 806) and an IP table-based interception interface 808. The facades interface receives the application data into appropriate client processes: TCP transparent and non-transparent clients, Unix domain sockets client and API client, as shown. A multiplexer combines the client data and inputs through a transformations component 814 that includes de-duplication, compression, and other appropriate processes for transmission through a transports component 816. The transports component 816 transmits the data using the BURST, TCP, and other pluggable protocols from the EWOC library 810 to the WAN 820. An application specific host interface component 818 provides an interface for user and system control over application operation.

As shown in FIG. 8, the transformations component 814 includes a compression function. This compression function may be a fast compression process using an LZ class algorithm, and that provides a choice of levels: LZ_L1 (faster); LZ_L2; or LZ_L3 (higher compression ratio). It may be a deep compression function using an LZH class algorithm that uses moderate CPU resources and provides a choice of levels: LZH_L1 (faster); LZH_L2; LZH_L3; or LZH_L4 (higher compression ratio). Other compression schemes may also be used.

The EWOC library 810 may be implemented through an application program interface (API). One receiving port is provided for all incoming connection requests and transfers to minimize UDP ports usage (RPNiPR). With respect to the interface with the BURST layer, the system multiplexes all EWOC pipes into one BURST connection to minimize overhead and contention. For the embodiment of FIG. 8, the BURST protocol is illustrated as being implemented within the EWOC library, though it may also be provided as a separate functional component or software routine.

Embodiments of the WAN optimized transmission protocols and interfaces utilizing the EWOC library 810 and BURST protocol may be used in any appropriate data processing and storage environment, such as to transfer information to and from the cloud, process data for virtual machine images, provide data for data science analysis, transmit data from local hardware/devices, and provide data for streaming processing. Applications also include sharing the data in a hybrid cloud, and providing collaboration, backup, and Storage-as-a-Service (distributed storage) tools.

Embodiments may be applied to optimizing data transfers in practically any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform. It may also represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated and stored within the network may be stored in any number of persistent storage locations and devices, such as local client storage, server storage, or network storage. In an embodiment the network may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays, or flash memory devices.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of optimizing data transmission across a wide area network (WAN), comprising:
    providing a data transmission protocol stack comprising a transmission control protocol (TCP) layer that exchanges data processed by one or more hosts of the WAN, and an Internet Protocol (IP) layer that transports datagrams encapsulating the data to routers in the WAN;
    defining, for use by network interface device components, a user datagram protocol (UDP)-based transmission layer within the data transmission protocol stack and that interfaces with the TCP layer and that transmits data and control packets between the network interface device components of hosts and receivers of the WAN using a unicast duplex protocol; and
    defining, for the network interface device components, a WAN optimization components (WOC) layer within the data transmission protocol stack and that interacts with the UDP-based transmission layer in the network interface device components, and provides transport protocol optimization of big data transfers through the UDP-based transmission layer by transparently intercepting TCP transfers from one or more applications generating the data transmission and defining modified routing rules so that application traffic is directed to appropriate WOC home nodes to prevent a need to modify any of the one or more applications.

2. The method of claim 1 wherein the UDP-based transmission protocol preserves user message boundaries during network transfers over the WAN.

3. The method of claim 2 wherein the user message comprises a transaction, the method further comprising:
    breaking the transaction down to data chunks, wherein the size of each data chunks of the data chunks is fixed for any given transaction and does not exceed an underlying transport maximum transmission unit; and
    tracking each data chunk on the receiver in a bitmap, wherein each data chunk is associated with one bit in the bitmap and the bitmap holds all the bits for the transaction.

4. The method of claim 3 further comprising: dividing the bitmap is divided into ranges, wherein a length of the range is based on a number of bits that can fit into underlying transport maximum transmission unit.

5. The method of claim 1 wherein the WAN comprises at least one host executing the one or more applications generating the data and one or more receivers receiving the data.

6. The method of claim 5 wherein the WOC layer is provided in of: a library that can be integrated into one or more of the applications, and an operating system level features in which the WOC layer provides a network tunnel transparent for the one or more of the applications.

7. The method of claim 6 wherein the one or more applications comprises a WOC daemon process that can be run on a physical or virtual host on a local area network (LAN) segment coupled to the WAN.

8. The method of claim 7 further comprising aggregating multiple TCP streams for the one or more applications into the data transmission protocol stack for disaggregation and distribution through a corresponding WOC daemon process running on a receiver of the one or more receivers.

9. The method of claim 8 further comprising compressing and encapsulating the aggregated multiple TCP streams prior to disaggregation and distribution in the receiver.

10. The method of claim 1 wherein the modified routing rules are used by a transmitting data center to aggregate a payload from multiple TCP streams into a WOC protocol stack, and by a remote WOC daemon process to perform reverse transformations to restore original TCP streams and distribute them to final destinations in the WAN.

11. A method of optimizing large-scale data transfers in a wide area network (WAN) comprising:
    aggregating, in a data transmitter of the WAN, multiple data streams presented in accordance with a transmission control protocol (TCP) to form aggregated TCP data;
    encapsulating the aggregated TCP into a WAN optimized protocol format through a WAN optimization components (WOC) layer that is configured to provide transport protocol optimization through a user datagram protocol (UDP)-based transmission layer defined for use by network device interface components including the data transmitter, to form encapsulated data by, in part, transparently intercepting TCP transfers from one or more applications generating the data transmission and defining modified routing rules so that application traffic is directed to appropriate WOC home nodes to prevent a need to modify any of the one or more applications; and
    transmitting the encapsulated data to one or more receivers within the network device interface components of the WAN for disaggregation and transmission to final destination nodes.

12. The method of claim 11 wherein the UDP-based transmission layer preserves user message boundaries during network transfers over the WAN, and the user message comprises a transaction, the method further comprising:
    breaking the transaction down to data chunks, wherein the size of each data chunks of the data chunks is fixed for any given transaction and does not exceed an underlying transport maximum transmission unit;
    tracking each data chunk on the receiver in a bitmap, wherein each data chunk is associated with one bit in the bitmap and the bitmap holds all the bits for the transaction; and
    dividing the bitmap is divided into ranges, wherein a length of the range is based on number of bits that can fit into underlying transport maximum transmission unit.

13. The method of claim 12 wherein the host executes an application processing the data comprising at least part of the large-scale data transfers, wherein the application comprises a WOC daemon process that can be run on a physical or virtual host on a local area network (LAN) segment coupled to the WAN.

14. The method of claim 13 wherein the one or more receivers each execute a corresponding WOC daemon process to perform the disaggregation and transmission to final destination nodes.

15. The method of claim 11 wherein the modified routing rules are used by a transmitting data center to aggregate a payload from multiple TCP streams into a WOC protocol stack, and by a remote WOC daemon process to perform reverse transformations to restore original TCP streams and distribute them to final destinations in the WAN.

16. A system for optimizing large-scale data transfers in a wide area network (WAN) comprising:
   a first component aggregating, in a data transmitter circuit of the WAN, multiple data streams presented in accordance with a transmission control protocol (TCP) to form aggregated TCP data;
   a second circuit encapsulating the aggregated TCP into a WAN optimized protocol format, for use by network interface device components including the circuits, through a WAN optimization components (WOC) layer that is configured to provide transport protocol optimization to form encapsulated data by, in part, transparently intercepting TCP transfers from one or more applications generating the data transmission and defining modified routing rules so that application traffic is directed to appropriate WOC home nodes to prevent a need to modify any of the one or more applications; and
   a transmitter transmitting the encapsulated data to one or more receivers of the WAN for disaggregation and transmission to final destination nodes.

17. The system of claim 16 wherein the UDP-based transmission layer preserves user message boundaries during network transfers over the WAN, and the user message comprises a transaction, the system further comprising a UDP-based protocol component breaking the transaction down to data chunks, wherein the size of each data chunks of the data chunks is fixed for any given transaction and does not exceed an underlying transport maximum transmission unit; tracking each data chunk on the receiver in a bitmap, wherein each data chunk is associated with one bit in the bitmap and the bitmap holds all the bits for the transaction; and dividing the bitmap is divided into ranges, wherein a length of the range is based on number of bits that can fit into underlying transport maximum transmission unit.

18. The system of claim 17 wherein the host executes an application processing the data comprising at least part of the large-scale data transfers, wherein the application comprises a WOC daemon process that can be run on a physical or virtual host on a local area network (LAN) segment coupled to the WAN.

19. The system of claim 18 wherein the one or more receivers each execute a corresponding WOC daemon process to perform the disaggregation and transmission to final destination nodes.

20. A computer program product comprising a non-transitory computer usable medium having machine readable code embodied therein for:
   providing a data transmission protocol stack comprising a transmission control protocol (TCP) layer that exchanges data processed by one or more hosts of a WAN, and an Internet Protocol (IP) layer that transports datagrams encapsulating the data to routers in the WAN;
   defining, for use by network interface device components, a user datagram protocol (UDP)-based transmission layer within the data transmission protocol stack and that interfaces with the TCP layer and that transmits data and control packets between the network interface device components of hosts and receivers of the WAN using a unicast duplex protocol; and
   defining, for the network interface device components, a WAN optimization components (WOC) layer within the data transmission protocol stack and that interacts with the UDP-based transmission layer and provides transport protocol optimization of big data transfers through the UDP-based transmission layer in the network interface device components, by transparently intercepting TCP transfers from one or more applications generating the data transmission and defining modified routing rules so that application traffic is directed to appropriate WOC home nodes to prevent a need to modify any of the one or more applications.

* * * * *